United States Patent [19]  
Eibeck et al.

[11] 4,082,839  
[45] Apr. 4, 1978

[54] PREPARATION OF SULFUR FLUORIDES

[75] Inventors: Richard Elmer Eibeck, Orchard Park; Robert Edwin Booth, Hamburg, both of N.Y.

[73] Assignee: Allied Chemical Corporation, Morris Township, N.J.

[21] Appl. No.: 782,142

[22] Filed: Mar. 28, 1977

Related U.S. Application Data

[63] Continuation-in-part of Ser. No. 592,444, Jul. 2, 1975, abandoned.

[51] Int. Cl.² ............... C01D 3/02; C01B 17/45; C01B 7/22; C01B 7/02
[52] U.S. Cl. ............... 423/489; 423/467; 423/469; 423/472; 423/481; 423/483; 423/500

[58] Field of Search ............... 423/467, 468, 469, 489, 423/481, 500, 472

[56] References Cited  
U.S. PATENT DOCUMENTS 1,923,094  8/1933  Jenness ............... 423/467 X  
3,074,781  1/1963  Anello et al. ............... 423/468

Primary Examiner—Edward Stern  
Attorney, Agent, or Firm—Alan M. Doernberg; Jay P. Friedenson

[57] ABSTRACT

A process, which may be continuous, for preparation of sulfur fluorides by reacting a sulfur chloride component with a fluorine containing component selected from the group consisting of nitrosyl fluoride and nitrosyl fluoride-hydrogen fluoride complex.

18 Claims, 4 Drawing Figures

PREPARATION OF SULFUR FLUORIDES

CROSS-REFERENCE TO RELATED APPLICATION

This is a continuation-in-part of our application Ser. No. 592,444, filed July 2, 1975, now abandoned.

BACKGROUND OF THE INVENTION

This invention concerns inorganic fluorine chemistry and more particularly concerns a process by means of which sulfur tetrafluoride, sulfur chloride pentafluoride and sulfur hexafluoride may be prepared with the use of little or no elemental fluorine as a reactant.

Heretofore, sulfur tetrafluoride ($SF_4$), sulfur chloride pentafluoride ($SF_5Cl$) and sulfur hexafluoride ($SF_6$) have been prepared by means of processes which utilize direct fluorination of sulfur.

Sulfur hexafluoride is a particularly desirable compound since it is almost totally inert, being unaffected by aqueous or fused alkali, ammonia or oxygen and even alkali metals react appreciably only at elevated temperatures. In addition, sulfur hexafluoride has a high dielectric strength which has led to the use of sulfur hexafluoride as an insulating atmosphere for high voltage electrical equipment.

Sulfur tetrafluoride has particular utility as an intermediate to the preparation of sulfur hexafluoride and as an intermediate in the preparation of many other fluorine containing compounds. For example, sulfur tetrafluoride reacts with compounds containing carboxylic and sulfonic acid groups to form acid fluorides; reacts with organic compounds containing a carbon containing group such as aldehydes and ketones to replace the oxygen atom by two fluorine atoms, even in the presence of unsaturated carbon atoms; reacts with most inorganic oxides and sulfides to give corresponding fluorides or oxyfluorides; reacts with transition metal oxides or sulfides to obtain corresponding transition metal fluorides and reacts with organic chlorides in the presence of boron trichloride to yield corresponding fluorides.

Sulfur chloride pentafluoride reacts with itself at about 400° C to yield sulfur hexafluoride, sulfur tetrafluoride and chlorine. As previously discussed, the resulting sulfur hexafluoride has substantial utility due to its inert nature and high dielectric strength. In addition, sulfur chloride pentafluoride is a powerful oxidizing agent and oxidizes alcohols and aldehydes to carboxylic acids and aromatic amines to azo compounds. Sulfur chloride pentafluoride can add across the double or triple bonds to olefins and acetylenes to obtain carbon compounds to which chlorine and $SF_5$ has been incorporated through addition.

While the foregoing compounds, i.e., sulfur hexafluoride, sulfur tetrafluoride and sulfur chloride pentafluoride have a large amount of utility, commercially, they have been prepared only by means of processes which have serious disadvantages. Such fluoride containing compounds were prepared in the prior art through the use of elemental fluorine, expensive reaction solvents, expensive alkali metal fluorides, or through electrochemical fluorination. A process for preparing a fluorine containing compound which requires the use of elemental fluorine is desirably avoided since the preparation of elemental fluorine requires fluorine generators which are operated only with difficulty. Such fluorine generators due to the extremely high chemical reactivity of fluorine, must be manufactured of costly materials of construction in an attempt to extend the life of the generators. Even when the best available materials of construction are employed in the fluorine generators, the fluorine attacks the materials of construction, thus requiring that parts of the generators be frequently replaced. In addition, elemental fluorine must be carefully handled since inadvertent leaks or mixing fluorine with other compounds or compositions can result in serious explosions. Since elemental fluorine is to be avoided in the preparation of sulfur hexafluoride, sulfur tetrafluoride and sulfur chloride pentafluoride, attempts have been made in the prior art to prepare sulfur fluorides, particularly sulfur tetrafluoride, without using elemental fluorine. Such proposed processes for preparing sulfur fluorides have not been entirely satisfactory since the processes required expensive reaction solvents, utilized expensive alkali metal fluorides which could be economically regenerated or recovered, or utilized electro-chemical fluorination which requires costly and sophisticated processing equipment.

Additionally, prior art processes for preparing the previously mentioned sulfur fluorides did not permit recycling and regeneration of the reactants which were more difficult to prepare and more costly to use.

A prior art process for producing thionly fluoride, $SOF_2$, from sulfur chlorides and NOF or NOF.nHF is disclosed in U.S. Pat. No. 3,074,781. The failure of the disclosed process to have produced $SF_4$ is believed to be due to the lack of anhydrous conditions such that any $SF_4$ that might have been formed during the experiments reported therein would have been hydrolyzed to $SOF_2$ by water remaining in the system or, more likely, in the distillation and sampling steps that followed.

BRIEF DESCRIPTION OF THE INVENTION

In accordance with the invention, there is provided a process for preparing a sulfur fluoride component which is sulfur tetrafluoride, sulfur chloride pentafluoride or mixtures thereof comprising reacting under anhydrous conditions a sulfur chloride component selected from sulfur monochloride, sulfur dichloride, sulfur tetrachloride and mixtures thereof, with a fluorine containing compound selected from nitrosyl fluoride, nitrosyl fluoride-hydrogen fluoride complexes and mixtures thereof at a temperature above the melting point of the highest melting of any compounds in the reaction mixture of sulfur chloride component and fluorine containing component. Sulfur tetrafluoride is the predominant sulfur fluoride component when nitrosyl fluoride-hydrogen fluoride complex is the predominant fluorine containing component. Sulfur chloride pentafluoride is the predominant sulfur fluoride component when nitrosyl fluoride is the predominant fluorine containing component and elemental chlorine is present. A mixture is thereby formed of the sulfur fluoride component and nitrosyl chloride. The process further includes recovering from the mixture the sulfur floride component as the principal reaction product.

DETAILED DESCRIPTION OF THE INVENTION

Figure 1:
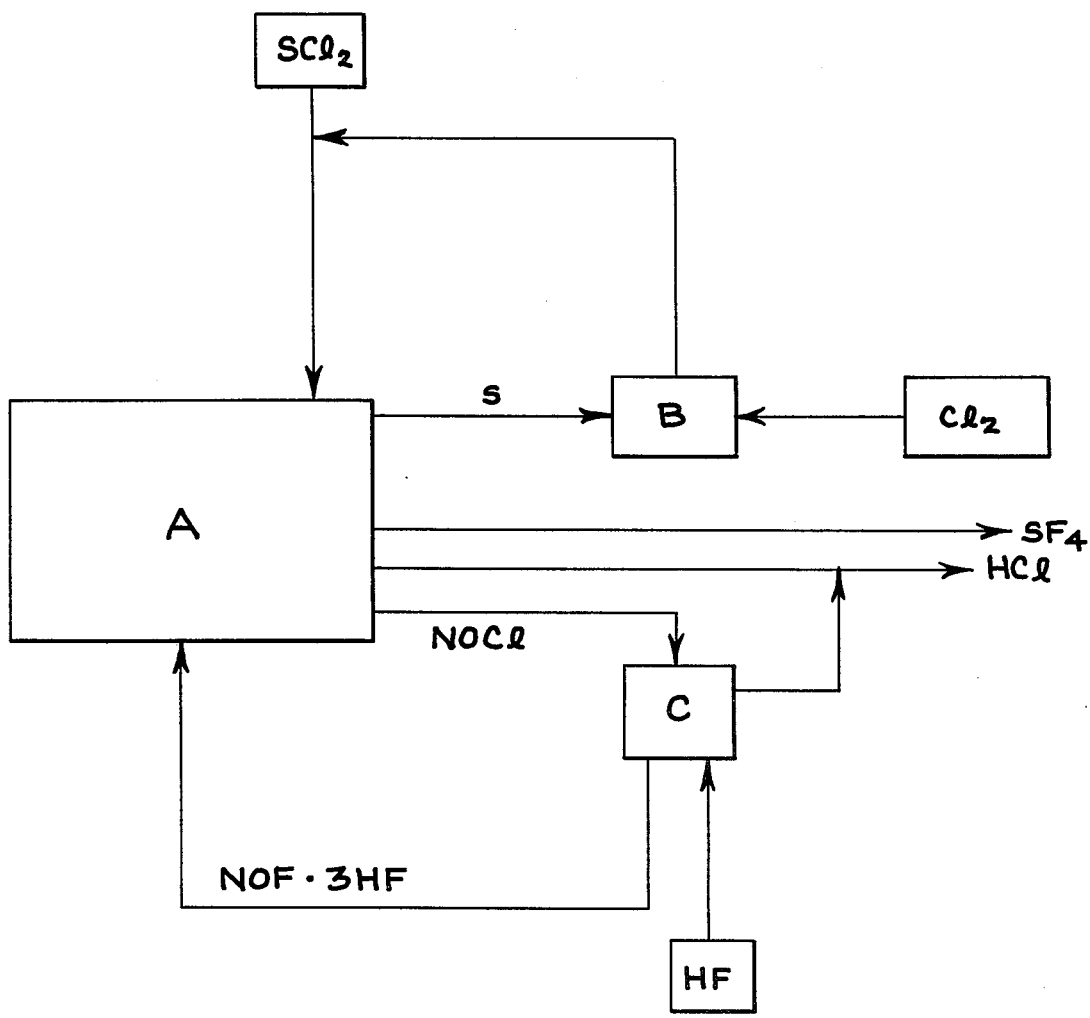

The sulfur chloride component may be prepared in the presence of the fluorine containing compound by reacting sulfur or a lower sulfur chloride with chlorine at a temperature above about −30° C.

The process may be made continuous with only the continuous addition of sulfur and chlorine, which may be in the form of a sulfur chloride, and the continuous addition of hydrogen fluoride to replace reactants which have been used in the process. By-product nitrosyl chloride can be reacted with hydrogen fluoride to form nitrosyl fluoride-hydrogen fluoride complex which may be recycled for direct use in the reactant mixture. When nitrosyl fluoride is used as the fluorine containing compound in the reactant mixture, nitrosyl fluoride-hydrogen fluoride complex may be passed through sodium fluoride or potassium fluoride to release nitrosyl fluoride for use in the reactant mixture. Hydrogen fluoride trapped by the potassium fluoride of sodium fluoride may then be released by heating the resulting potassium fluoride-hydrogen fluoride or sodium fluoride-hydrogen fluoride complex.

The released or freed hydrogen fluoride may then be recycled to form nitrosyl fluoride-hydrogen fluoride complex by reaction with nitrosyl chloride. The released or free potassium fluoride or sodium chloride may be reused in decomposing the nitrosyl fluoride-hydrogen fluoride complex.

Sulfur tetrafluoride may be formed as the predominant sulfur fluoride when nitrosyl fluoride-hydrogen fluoride complex is selected as the predominant fluorine containing component. Sulfur chloride pentafluoride may be formed as the predominant sulfur fluoride when nitrosyl fluoride is selected as the fluorine containing compound and excess chlorine is added to the mixture.

When sulfur chloride pentafluoride is formed in the reactant mixture, it may be heated without being separated from the reactant mixture to a temperature of between about 350° and 475° C, or below 200° C in the presence of a metallic catalyst such as copper, to form a new reaction product mixture containing sulfur tetrafluoride, sulfur hexafluoride and chlorine. Alternatively, the sulfur chloride pentafluoride may be fractionated from the original reaction mixture and then converted to sulfur tetrafluoride, sulfur hexafluoride and chlorine. When the original reaction mixture contains sulfur tetrafluoride as product, the sulfur tetrafluoride either while remaining in the reaction mixture, or after being fractionated from the reaction mixture, may be reacted with chlorine and nitrosyl fluoride to form a third reaction mixture including sulfur chloride pentafluoride and nitrosyl chloride. The sulfur chloride pentafluoride from the third reaction mixture may be further reacted with itself, as previously discussed, to form sulfur hexafluoride, sulfur tetrafluoride and chlorine.

As previously mentioned, the process of the invention is a process for preparing a sulfur fluoride which is sulfur tetrafluoride, sulfur chloride pentafluoride, or mixtures thereof which comprises reacting under anhydrous conditions, a reactant mixture including a sulfur chloride component with a fluorine containing compound selected from the group consisting of nitrosyl fluoride and nitrosyl fluoride-hydrogen fluoride complexes at a temperature above the melting point of the highest melting of said compounds in said reactant mixture.

Sulfur chloride used in the reactant mixture may be sulfur tetrachloride $SCl_4$, sulfur dichloride ($SCl_2$), sulfur monochloride ($S_2Cl_2$) or mixtures thereof. Sulfur dichloride or sulfur tetrachloride are generally preferred due to more complete reaction. $SCl_2$ may be added as $SCl_2$ to the mixture, may be prepared from chlorine and sulfur monochloride within the mixture, or may be prepared from chlorine and sulfur within the mixture. Typically, as described in Canadian Patent No. 348,290, sulfur chlorides are formed by contacting dry solid sulfur with chlorine gas at below 50° C to form liquid $S_2Cl_2$ in which sulfur dissolves. Continued passage of chlorine gas produces, first $S_2Cl_2$ and then higher chlorides. After passing chlorine for a sufficient time, a mixture of $SCl_2$ and $SCl_4$ is formed with 48.4% $SCl_4$ and 51.6% $SCl_2$. This mixture, known as "75% Cl", is among the preferred sulfur chloride components. Other sulfur chlorides or mixtures can be isolated from this reaction system at various stages of chlorination.

In addition, sulfur or chlorine or both may be introduced into the system in elemental form. It is preferred that, if both are to be added, that they be first reacted to form a sulfur chloride.

The fluorine containing component for use in the reactant mixture is nitrosyl fluoride (NOF), nitrosyl fluoride-hydrogen fluoride complexes (NOF.3HF or NOF.6HF) or mixtures thereof. Exemplary mixtures include 67 mole percent NOF.3HF and 33 mole percent NOF.6HF.

NOF.3HF is readily prepared from nitrosyl chloride (NOCl) and hydrogen fluoride (HF) and for this reason is the preferred fluorine containing compound for use in preparing sulfur tetrafluoride ($SF_4$). However, since the complex is much less reactive than nitrosyl fluoride itself, NOF should be used for the preparation of $SF_5Cl$. NOF can conveniently be prepared from NOF.3HF by passing NOF.3HF through potassium fluoride-hydrogen fluoride complex (KF.HF). The KF.HF complex may be decomposed by heat to release both KF and HF for reuse.

The chemical equations for preparations of the fluorine containing compounds are as follows;

1. NOCl + 4 HF → NOF.3HF + HCl

2. NOF.3HF + 3KF → NOF + 3KF.HF

3. KF.HF → KF + HF

The particular sulfur fluoride or sulfur fluoride mixture prepared as the result of such process is determined by reaction temperature, whether chlorine is introduced as an additional compound in the mixture, whether nitrosyl fluoride-hydrogen fluoride complex is chosen as the fluorine containing compound, the relative percentages of such compounds in the reactant mixture and whether a catalyst is used to increase reaction rate.

When there is relatively little free chlorine in the reactant mixture, the predominant sulfur fluoride has been found to be sulfur tetrafluoride regardless of other variables. Sulfur tetrafluoride is then the predominant sulfur fluoride whether or not nitrosyl fluoride or nitrosyl fluoride-hydrogen fluoride complex is selected as the fluorine containing compound. Under such conditions, sulfur tetrafluoride is the predominant sulfur fluoride regardless of reaction temperature provided that the minimum temperature is high enough to permit the reaction to sulfur tetrafluoride to proceed, which minimum temperature has generally been found to be just above the melting point, and provided that the temperature is below the auto-decomposition temperature of the reactants and products in the reactant mixture and below the temperature which can be withstood by the reaction equipment. In general the temperature should be below 500° C.

In addition, when free chlorine is not present in the reactant mixture, the resulting sulfur fluoride appears to be predominantly sulfur tetrafluoride regardless of relative percentages of reactants.

Similarly, when nitrosyl fluoride-hydrogen fluoride complex is used as the fluorine containing compound, the predominant sulfur fluoride is sulfur tetrafluoride regardless of reaction temperature, whether or not chlorine is introduced into the reactant mixture, the relative percentages of compounds in the reactant mixture.

It has, however, been unexpectedly found that when both free chlorine is present and nitrosyl fluoride is used as the fluorine containing compound, substantial amounts of sulfur chloride pentafluoride result from the reaction and that as the percentage of chlorine in the reactant mixture increases, the percentage of sulfur chloride pentafluoride resulting from the reaction increases. Thus, in the process as generically described, nitrosyl fluoride may be selected as the fluorine-containing compound and excess $Cl_2$ may be added to the reaction mixture to form sulfur chloride pentafluoride as the predominant sulfur fluoride. In some preferred forms of this process, nitrosyl chloride is formed as a by-product and the by-product nitrosyl chloride is reacted with hydrogen fluoride to form nitrosyl fluoride-hydrogen fluoride complex which complex is decomposed to regenerate nitrosyl fluoride which is recycled to the reactant mixture. In some such preferred forms, the nitrosyl fluoride-hyrogen fluoride complex is decomposed to regenerate nitrosyl fluoride by contacting the complex with potassium fluoride or sodium fluoride to form nitrosyl fluoride and potassium fluoride and potassium fluoride-hydrogen fluoride or sodium fluoride-hydrogen fluoride complex.

For example, about 10 weight percent sulfur chloride pentafluoride results when 2.3 percent chlorine by weight of $SCl_2$ is present as a reactant. About 25 weight percent sulfur chloride pentafluoride results when about 5.9 percent chlorine by weight of $SCl_2$ is present as a reactant. About 50 weight percent sulfur chloride pentafluoride results when about 12.1 percent chlorine by weight of $SCl_2$ is present as a reactant and essentially all of the resulting sulfur fluoride is sulfur chloride pentafluoride when 25.6 percent chlorine by weight of $SCl_2$ is present as a reactant.

When the foregoing reaction resulting in sulfur chloride pentafluoride occurs at a temperature between about 350° and 475° C, the sulfur chloride pentafluoride reacts with itself to form sulfur hexafluoride, sulfur tetrafluoride and chlorine. At lower temperatures, sulfur hexafluoride and and sulfur tetrafluoride are only slowly formed from the sulfur chloride pentafluoride while at higher temperatures, i.e., at about 400°–475° C, sulfur hexafluoride and sulfur tetrafluoride are rapidly formed from the sulfur chloride pentafluoride.

When a metallic catalyst such as copper is present, sulfur hexafluoride and sulfur tetrafluoride may be rapidly formed from sulfur chloride pentafluoride at an elevated temperature, i.e., below about 200° C.

The chemical equations for the formation of sulfur tetrafluoride by the process of this invention are believed to be as follows:

4. $2 SCl_2 + NOF.3HF \rightarrow SF_4 + NOCl + 3HCl + S$

5. $2 SCl_2 + 4 NOF \rightarrow SF_4 + 4NOCl + S$ $S_2Cl_2$ may be substituted for the $SCl_2$ with a corresponding increase in free sulfur by-product.

6. $SCl_4 + 4 NOF \rightarrow SF_4 + 4NOCl$

By-products such as elemental chlorine and elemental sulfur may be observed from this reaction.

The chemical equation for formation of sulfur chloride pentafluoride by the process of this invention is as follows:

7. $SCl_2 + 5NOF + 2Cl_2 \underset{25°\ C}{\rightarrow} 3SF_5Cl + 5NOCl$

Again, $S_2Cl_2$ may be substituted for $SCl_2$.

8. $SF_4 + Cl_2 + NOF \rightarrow 3SF_5Cl + NOCl$ which is believed to partially establish the mechanism of equation 6. That is, it is believed that $SCl_2$ is first converted to $SF_4$ by NOF and then to $SF_5Cl$. Thus when sulfur tetrachloride is initially formed, it may be reacted with chlorine and nitrosyl fluoride to form a further reaction mixture including sulfur chloride pentafluoride and nitrosyl chloride. Molar ratios of $SF_4$ to $Cl_2$ to NOF are preferably equal to at least 1:1:1, as indicated in the description of Reactor D of FIG. 2 below.

Sulfur hexafluoride ($SF_6$) is prepared from $SF_5Cl$ as follows:

9. $2 SF_5Cl \underset{400°\ C}{\rightarrow} SF_6 + SF_4 + Cl_2$ or

10. $2 SF_5Cl \underset{200°\ C}{\rightarrow} SF_6 + SF_4 + Cl_2$

When $S_2Cl_2$, $Cl_2$ and NOF 3HF are used to produce $SF_4$, the mechanisms and stoichiometry was observed:

11. $S_2Cl_2 + 3Cl_2 + 8\ NOF.3HF \rightarrow 2SF_4 + 8NOCl + 24HF$

It is preferred that any HF formed not be permitted to react with NOCl to form HCl and NOF since the HCl can attack the $SF_4$ by the reaction:

12. $4HCl + SF_4 \rightarrow SCl_2 + Cl_2 + 4HF$ $SF_4$ and/or HF are preferably separated from the NOCl such that the HCl formed from NOCl and HF can be removed from the system.

In some experiments, instead of the stoichiometry of equation 10, the following stoichiometry is observed:

$S_2Cl_2 + 3\ Cl_2 + 20\ NOF.3HF \rightarrow 2SF_4 + 8NOCl + 12\ NOF.5HF$

Whether NOF.5HF represents a true species or a mixture of NOF.3HF and NOF.6HF, a relationship among NOF.nHF complexes has been observed as:

$6HF + NOCl \rightarrow NOF.5HF + HCl$

"NOF.5HF" $\underset{64°}{\rightarrow}$ C NOF.4HF + HF

"NOF.4HF" $\underset{82°}{\rightarrow}$ C NOF.3HF + HF

For simplicity, in the description of the present invention, the observed NOF.4HF and NOF.5HF have been considered mixtures of NOF.3HF and NOF.6HF. Any of these species are regarded as nitrosyl fluoride-hydrogen fluoride complexes.

The invention contemplates numerous continuous processes for the preparation of sulfur fluorides, for example, a continuous process for the preparation of sulfur tetrafluoride comprises combining nitrosyl fluoride-hydrogen fluoride complex with chlorine and sulfur as elemental sulfur and elemental chlorine, as a sulfur chloride or as a mixture thereof as ingredients in a reaction mixture; continuously reacting the ingredients together under anhydrous conditions by causing the reaction mixture to reach a temperature above about $-30°$ C; continuously fractionating the reaction mixture to remove hydrogen chloride and then to remove sulfur tetrafluoride; and continuously adding sulfur, chloride and hydrogen fluoride to the mixture to maintain a numerical ratio of sulfur atoms, to chlorine atoms, to nitrosyl fluoride molecules, to hydrogen fluoride molecules of about greater than 1:4:4:12. By this ratio is meant an excess of other reactants to sulfur atoms. Hydrogen fluoride, in particular, should be kept in a ratio greater than 12 so that by-product nitrosyl chloride is immediately converted to nitrosyl fluoride-hydrogen fluoride complex to continue the reaction. Sulfur and chloride may either be added as a sulfur chloride or in elemental form, with sulfur chlorides being formed in situ.

The continuous process contemplated for preparation of sulfur fluorides employ one or more novel reactions selected from those illustrated by equations 4, 5, 6, 7 and 8. Four of the continuous processes contemplated are illustrated by the drawings.

FIG. 1 shows a flow diagram for a continuous process for preparation of sulfur tetrafluoride ($SF_4$) from hydrogen fluoride (HF), chlorine ($Cl_2$) and sulfur dichloride ($SCl_2$). The only by-product resulting from the continuous process illustrated by FIG. 1 is hydrogen chloride (HCl). The main reaction, $2SCl_2 + NOF\ 3HF$ yields $SF_4 + NOCl + 3HCl + S$, takes place in Reactor A. Sulfur from Reactor A is transmitted to Reactor B for combination with chlorine to form additional $SCl_2$ which is recycled back to Reactor A. NOCl resulting from the reaction taking place in Reactor A is transmitted to Reactor C for combination with HF to reform NOF 3HF which is recycled to Reactor A. The result is a continuous process for production of $SF_4$ with HCl as a by-product. The apparent equation for preparation of $SF_4$ by means of the continuous process illustrated by FIG. 1 is $4HF + Cl_2 + SCl_2$ yields $SF_4 + 4HCl$. The continuous process for preparation of $SF_4$ in accordance with the process illustrated in FIG. 1 requires no elemental fluorine. Preparation of elemental fluorine requires large amounts of electrical energy, therefore, since elemental fluorine is not used in the process for preparation of $SF_4$ illustrated by FIG. 1, substantially less energy is required. A further energy saving results from the use of the process illustrated in FIG. 1, since all reactants can be introduced into their respective Reactors A, B and C at room temperature. No external heating of the reactors is required and excess heat may be removed from the reactors without complex refrigeration equipment, for example, by means of water or air at ambient temperatures.

Figure 2:
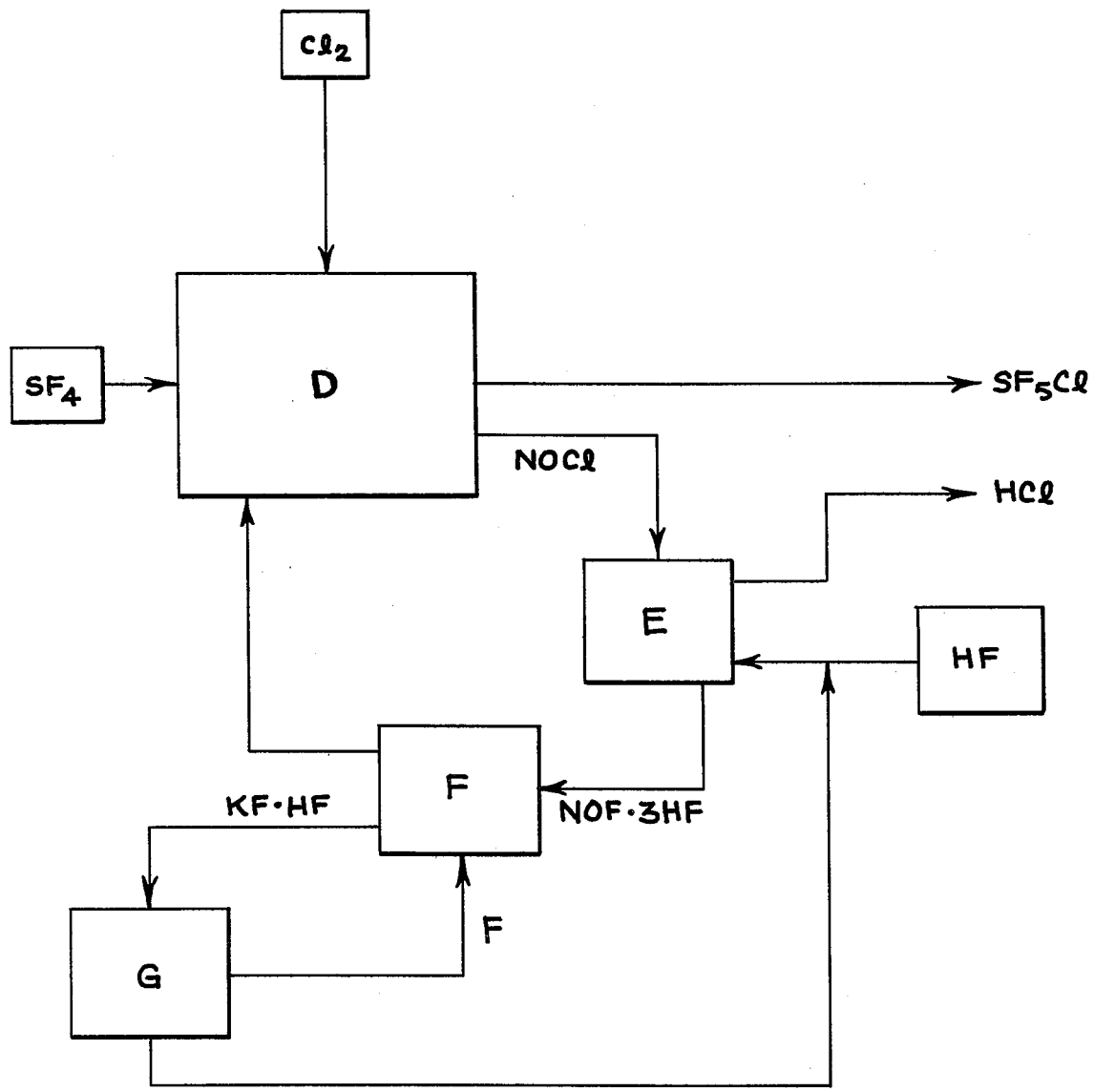

FIG. 2 is a flow diagram illustrating a continuous process for preparation of sulfur chloride pentafluoride ($SF_5Cl$) from hydrogen fluoride, sulfur tetrafluoride, and chlorine. The only by-product from the process illustrated in FIG. 2 is hydrogen chloride. The apparent chemical equation for preparation of sulfur chloride pentafluoride by means of the process illustrated in FIG. 2, is $SF_4 + Cl_2 + HF$ yields $SF_5Cl + HCl$.

In the process illustrated in FIG. 2, $SF_4$, $Cl_2$ and NOF are introduced into main Reactor D in molar ratios of at least 1:1:1. $Cl_2$ and NOF are desirably each introduced into Reactor D in molar ratios of greater than 1 with respect to $SF_4$ so that conversion of the $SF_4$ to $SF_5Cl$ proceeds rapidly, smoothly and completely. Reaction product nitrosyl chloride (NOCl) is removed from reactor D and introduced into Reactor E where it is combined with hydrogen fluoride to form nitrosyl fluoride-hydrogen fluoride complex (NOF.3HF). The NOF.3HF is then cycled through a bed of potassium fluoride (KF) to break up the NOF.3HF complex to form free NOF which is recycled to Reactor D. Potassium fluoride-hydrogen fluoride complex (KF.HF) resulting in Reactor F is removed to Reactor G where it is heated to free KF which is recycled to Reactor F and to free HF which is recycled to Reactor E. The process shown in FIG. 2 for preparation of sulfur chloride pentafluoride is superior to prior art processes since no free fluorine is required and since Reactors D, E and F do not require external heat for the continuous process to operate. Reactor G does, however, require sufficient heat, i.e., about 250° C to decompose the potassium fluoride-hydrogen fluoride complex. The heat provided to Reactor G is, however, a small energy input when compared with the energy required to produce free fluorine.

Figure 3:
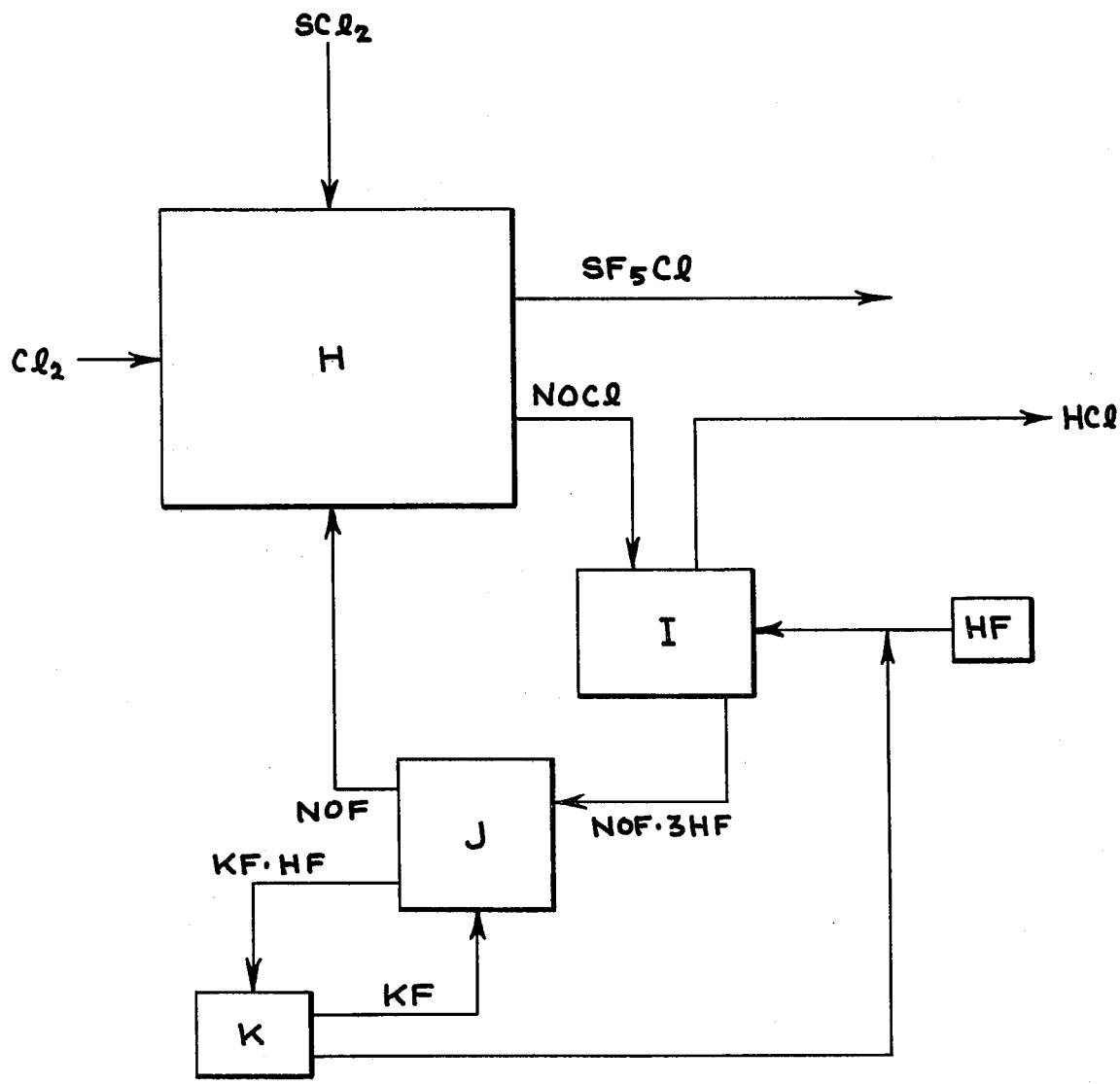

Another continuous process for the production of sulfur chloride pentafluoride uses sulfur dichloride, chlorine and hydrogen fluoride as inputs to the process with hydrogen chloride being the only by-product. Such a process is illustrated by the block diagram of FIG. 3. As indicated in FIG. 3, sulfur dichloride, chlorine and nitrosyl fluoride are introduced into Reactor H to produce sulfur chloride pentafluoride ($SF_5Cl$). Nitrosyl chloride (NOCl) resulting from the reaction in Reactor H is introduced into Reactor I where it is combined with hydrogen fluoride to form nitrosyl fluoride-hydrogen fluoride complex. The nitrosyl fluoride-hydrogen fluoride complex is removed from Reactor I and passed over potassium fluoride in Reactor J to free nitrosyl fluoride which is recycled to Reactor H and to form potassium fluoride-hydrogen fluoride complex which is introduced into Reactor K and heated to a temperature of about 250° C. Potassium fluoride is freed from the KF HF complex in Reactor K and is recycled to Reactor J. Hydrogen fluoride freed in Reactor K is recycled to Reactor I. The continuous process for preparaton of $SF_5Cl$ illustrated in FIG. 3 may be represented by the equation $5HF + 2Cl_2 + SCl_2$ yields $SF_5Cl + 5HCl$. As with the previous processes, less energy is required to manufacture $SF_5Cl$ in accordance with the process illustrated in FIG. 3 and prior art processes which required elemental fluorine. Reactors H, I and J in FIG. 3 efficiently operate at ambient temperature. Reactor K is the only reactor requiring an energy input. The energy introduced into reactor K is, however, small compared with the energy required to produce elemental fluorine which was required in prior art processes. Theoretically, $SCl_2$ introduced into Reactor H is present in a molar ratio of 1:2 with respect to the chlorine present in Reactor H and is present in a molar ratio of 1:5 to the nitrosyl fluoride present in Reactor H; however, in order to assure complete conversion of the $SCl_2$ to $SF_5Cl$, a slightly higher ratio of chlorine to $SCl_2$ and a slightly higher ratio of NOF to $SCl_2$ should be present.

Figure 4:
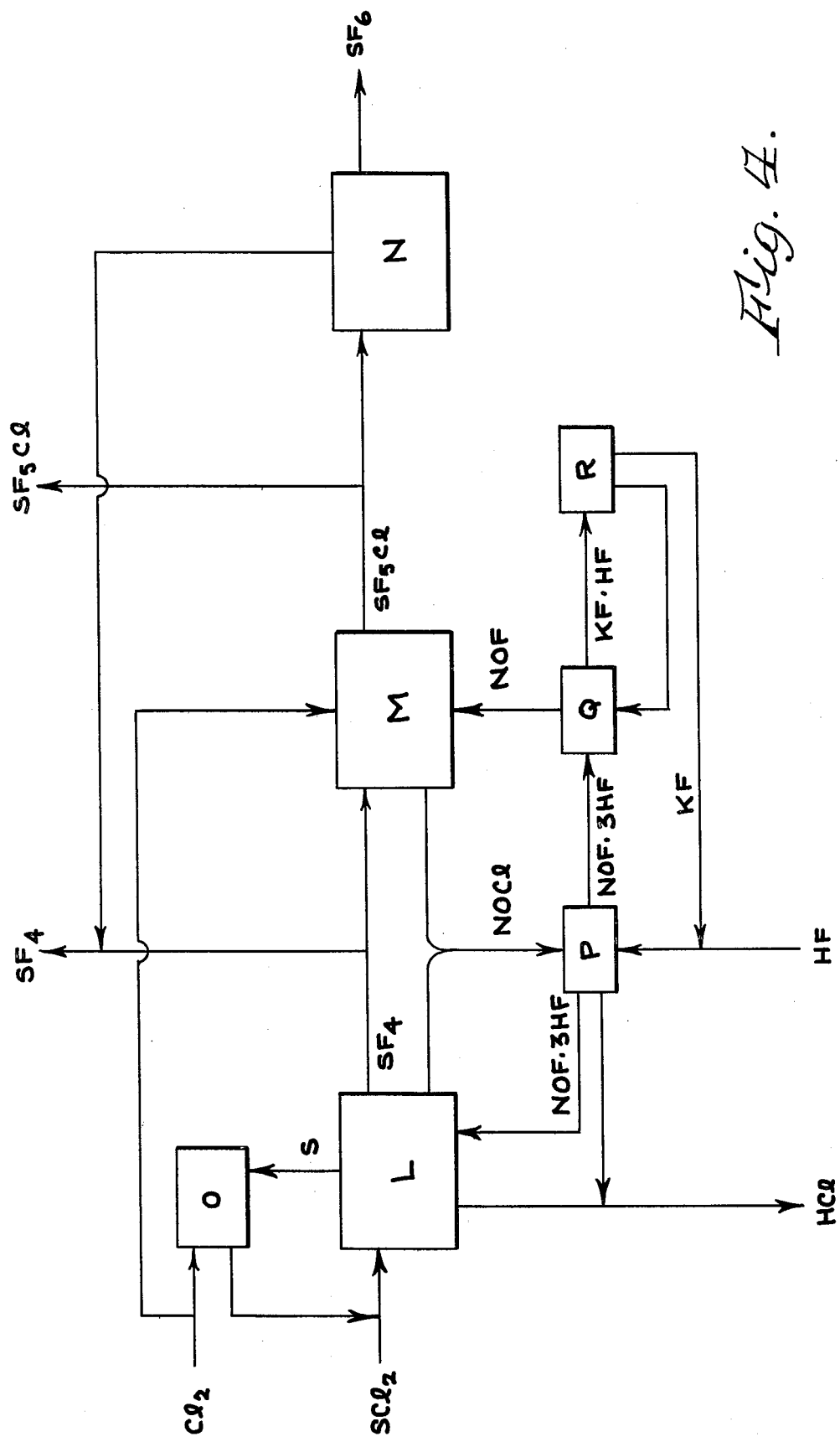

FIG. 4 illustates a continuous process for preparation of $SF_4$, $SF_5Cl$, and $SF_6$. The continuous process illlustrated in FIG. 4 is essentially a combination of the continuous processes previously illustrated in FIGS. 1 and 2 wherein $SF_4$ produced by the process illustrated in FIG. 1 is used as a reactant in the process illustrated in FIG. 2. In additiona, $SF_5Cl$ produced in FIG. 4 is introduced into a heated Reactor N which contains a copper catalyst and is heated to a temperature of about 200° C to form $SF_6$. $SF_4$ formed in Reactor N is recycled to produce additional $SF_5Cl$ and chlorine produced in Reaction N is similarly recycled to form additional $SF_5Cl$ or to form initial reactant $SCl_2$. In the operation of the continuous process illustrated by FIG. 4, $SCl_2$ and nitrosyl fluoride-hydrogen fluoride complex are introduced into reactor L. $SF_4$ resulting from the reaction in Reactor L is either removed from the process for other purposes, such as its use as an intermediate, or is introduced into Reactor M along with chlorine and nitrosyl fluoride. $SF_5Cl$ is produced in Reactor M and is similarly either removed for other purposes, such as its use as a chemical intermediate, or is introduced in Reactor N to form $SF_6$. Sulfur formed in Reactor L is introduced into Reactor O along with chlorine to form $SCl_2$ by the chlorination process described above. The $SCl_2$ is used in the manufacture of additional $SF_4$. Nitrosyl chloride formed in Reactor L is introduced into Reactor P where it is combined with hydrogen fluoride to reform additional nitrosyl fluoride-hydrogen fluoride complex for introduction into Reactor L. Hydrogen chloride formed in Reactor L is removed as a by-product. Nitrosyl chloride formed in Reactor M is removed to Reactor P where it is combined with hydrogen fluoride to form nitrosyl fluoride-hydrogen fluoride complex. Nitrosyl fluoride-hydrogen fluoride complex is then removed from Reactor P to Reactor Q which contains potassium fluoride. Nitrosyl fluoride is freed in Reactor Q and is recycled to Reactor M. In addition, potassium fluoride-hydrogen fluoride complex is formed in Reactor Q and is removed and introduced into Reactor R which is heated to a temperature of about 250° C to free the potassium fluoride which is recycled to Reactor Q and to free hydrogen fluoride which is recycled to Reactor P to form additional nitrosyl fluoride-hydrogen fluoride complex. The overall continuous process illustrated by FIG. 4 requires no elemental fluorine to produce $SF_4$, $SF_5Cl$, or $SF_6$. The only heat input required in the entire continuous process illustrated by FIG. 4 is in Reactor R to break down potassium fluoride-hydrogen fluoride complex and in Reactor N, to form $SF_6$ from $SF_5Cl$. The energy input required for Reactors R and H is substantially less than the energy which would have been required to produce elemental fluoride which is required for commercial prior art processes for the manufacture of sulfur fluorides.

The following examples 1-5 serve to illustrate basic reactions utilized in processes of the invention. Example 6 exemplified the criticality of anhydrous conditions when $SF_4$ is the sulfur fluoride component product.

EXAMPLE 1

Preparation of NOF:3HF complex

About 6 moles of HF and about 1 mole of NOCl are separately charged to a nickel flask cooled to −197° C. The flask is then allowed to warm to room temperature and then heated to 70° C for 5 hours. The reaction mixture is then analyzed. It is found that there has been about an 80% conversion to NOF:3HF.

EXAMPLE 2

Preparation of $SF_4$ from NOF:3HF and $SCl_2$

About 22 millimoles of NOF and about 65 millimoles of HF are charged into a "Kel-F" (a polyfluoroethylene) tube ¼ inch I.D. by ⅜ inch O.D. × 10 inches in dimensions at room temperature to form NOF: 3HF complex. The tube is then chilled to −196° C and 43 millimoles of $SCl_2$ are added. The tube is then allowed to reach room temperature for ½ hour. I.R. analysis of the products shows a large conversion of the reactants to $SF_4$.

EXAMPLE 3

Preparation of $SF_4$ from NOF and $SCl_2$

About 16.8 millimoles of $SCl_2$ and about 67 millimoles of NOF are separately introduced into a "Kel-F" tube having the dimensions set out in Example 2 at a temperature of −196° C. The tube is then allowed to reach room temperature and is held at room temperature overnight. I.R. analysis of the products indicates about 30% conversion of $SCl_2$ to $SF_4$.

EXAMPLE 4

Preparation of $SF_5Cl$ from $SF_4$, NOF and $Cl_2$

About 16.3 millimoles of $SF_4$, about 19.9 millimoles of $Cl_2$ and about 18.9 millimoles of NOF are separately introduced into a "Kel-F" tube having the dimensions set out in Example 2 at a temperature of −196° C. The tube is then permitted to reach room temperature and held for 16 hours. I.R. analysis of the products indicates no remaining $SF_4$ and a large concentration of $SF_5Cl$.

EXAMPLE 5

Preparation of $SF_6$ from $SF_5Cl$ $SF_5Cl$ is charged to an Inconel (nickel-chromium alloy) tube which is previously evacuated. The tube is then heated at about 100° C for 1 hour. The temperature is then raised to 200° C for another hour and to 340° C for an additional hour. I.R. analysis of the reaction product shows the presence of $SF_6$.

EXAMPLE 6

Preparation of $SOF_2$ from $SF_4$

This experiment demonstrates the ease of hydrolysis of $SF_4$ to $SOF_2$ and the sensitivity of $SF_4$ to a trace of moisture. A vacuum apparatus filled with a very humid atmosphere (about 90% relative humidity), then pumped down to less than 1 mm absolute pressure. Commercial $SF_4$ containing about 5 weight % $SOF_2$ was charged to this vacuum (3 g., 28 millimoles) to a pressure of about 500 mm absolute, and held at room temperature for 16 hours. Examination of the contents of the apparatus by infrared spectroscopy showed it to be exclusively $SOF_2$ and HF; there was no remaining $SF_4$. The apparatus was again evacuated to less than 1 mm absolute pressure, and charged with another portion of commercial $SF_4$ (3 g., 28 millimoles). Four hours later, infrared examination showed that the apparatus contained about equal parts $SF_4$, $SOF_2$ and HF. Again the apparatus was evacuated and recharged with commercial (3 g., 28 millimoles). Four hours later infrared examination showed no change: the apparatus contained $SF_4$, with no HF or $SOF_2$ above that introduced by the last charge of $SF_4$.

The apparatus was now sufficiently dry for resumption of experiments involving the preparation or use of $SF_4$. It should be noted that the present invention contemplates some $SF_4$ being hydrolyzed to $SOF_2$, so long as $SF_4$ is the principal reaction product which is either isolated or converted to $SF_6$. It should be noted that $SF_5Cl$, once formed, is not as water sensitive as $SF_4$.

We claim:

1. A process for preparing a sulfur fluoride component which is sulfur tetrafluoride, sulfur chloride pentafluoride or mixtures thereof comprising:

reacting under anhydrous conditions a sulfur chloride component selected from sulfur monochloride, sulfur dichloride, sulfur tetrachloride and mixtures thereof, with a fluorine containing component selected from nitrosyl fluoride, nitrosyl fluoride-hydrogen fluoride complexes and mixtures thereof, at a temperature above the highest melting point of any compound in the reaction mixture of sulfur chloride component and fluorine containing component;

sulfur tetrafluoride being the predominant sulfur fluoride component when nitrosyl fluoride-hyrogen fluoride complex is the predominant fluorine containing component and sulfur chloride pentafluoride being the predominant sulfur fluoride component when nitrosyl fluoride is the predominant fluorine containing component and elemental chlorine is present;

thereby forming a mixture of said sulfur fluoride component and nitrosyl chloride; and thereafter recovering from said mixture said sulfur fluoride component as the principal reaction product.

2. The process of claim 1 wherein the sulfur chloride component is prepared in the presence of the fluorine containing compound by reacting sulfur or a lower sulfur chloride with chlorine at a temperature above about −30° C.

3. The process of claim 1 wherein nitrosyl fluoride-hydrogen fluoride complex is selected as the fluorine containing compound to form sulfur tetrafluoride as the predominant sulfur fluoride component.

4. The process of claim 3 wherein nitrosyl chloride is formed as a by-product and said nitrosyl chloride is reacted with hydrogen fluoride to form nitrosyl fluoride-hydrogen fluoride complex which is recycled to the reactant mixture.

5. The process of claim 1 wherein nitrosyl fluoride is selected as the fluorine containing compound and excess $Cl_2$ is added to the reactant mixture to form sulfur chloride pentafluoride as the predominant sulfur fluoride.

6. The process of claim 5 wherein nitrosyl chloride is formed as a by-product and said nitrosyl chloride is reacted with hydrogen fluoride to form nitrosyl fluoride-hydrogen fluoride complex which complex is decomposed to regenerate nitrosyl fluoride which is recycled to the reactant mixture.

7. The process of claim 6 wherein nitrosyl fluoride-hydrogen fluoride complex is decomposed to regenerate nitrosyl fluoride by contacting said complex with potassium fluoride or sodium fluoride to form nitrosyl fluoride and potassium fluoride-hydrogen fluoride or sodium fluoride-hydrogen fluoride complex.

8. The process of claim 7 wherein the resulting potassium fluoride-hydrogen fluoride complex or sodium fluoride-hydrogen fluoride complex is heated to free hydrogen flouride which is recycled to form nitrosyl fluoride-hydrogen fluoride complex by reaction with nitrosyl chloride and to free the potassium fluoride or sodium fluoride for reuse in decomposing the nitrosyl fluoride-hydrogen fluoride complex.

9. The process of claim 1 wherein sulfur tetrafluoride product is reacted with chlorine and nitrosyl fluoride to form a further reaction mixture including sulfur chloride pentafluoride and nitrosyl chloride.

10. The process of claim 3 wherein the resulting sulfur tetrafluoride is reacted with chlorine and nitrosyl fluoride to form a further reaction mixture including sulfur chloride pentafluoride and nitrosyl chloride.

11. The process of claim 5 wherein the resulting sulfur chloride pentafluoride is heated to a temperature of between about 350° and about 475° C to form a reaction product mixture containing sulfur tetrafluoride, sulfur hexafluoride and chlorine.

12. The process of claim 9 wherein the resulting sulfur chloride pentafluoride is heated to a temperature of between about 350° and about 475° C to form a reaction product mixture containing sulfur tetrafluoride, sulfur hexafluoride and chlorine.

13. The process of claim 10 wherein the resulting sulfur chloride pentafluoride is heated to a temperature of between about 350° and about 475° C to form a reaction product mixture containing sulfur tetrafluoride, sulfur hexafluoride and chlorine.

14. The process of claim 11 wherein resulting sulfur tetrafluoride is recycled for reaction with chlorine and nitrosyl fluoride to form a reaction mixture including sulfur chloride pentafluoride and nitrosyl chloride.

15. The process of claim 9 wherein resulting nitrosyl chloride is reacted with hydrogen fluoride to form nitrosyl fluoride-hydrogen fluoride complex.

16. The process of claim 10 wherein resulting nitrosyl chloride is reacted with hydrogen fluoride to form nitrosyl fluoride-hydrogen fluoride complex.

17. A continuous process for the preparation of sulfur tetrafluoride comprising combining nitrosyl fluoride-hydrogen fluoride complex with chlorine and sulfur as elemental sulfur and elemental chlorine, as a sulfur chloride or as a mixture thereof as ingredients in a reaction mixture; continuously reacting said ingredients together under anhydrous conditions by causing the reaction mixture to reach a temperature above about −30° C; continuously fractionating the reaction mixture to remove hydrogen chloride and then to remove sulfur tetrafluoride; and continuously adding sulfur, chlorine and hydrogen fluoride to the mixture to maintain a numerical ratio of sulfur atoms, to chlorine atoms, to nitrosyl fluoride molecules, to hydrogen fluoride molecules of about greater than 1:4:4:12.

18. The process of claim 10 wherein the molar ratio of sulfur hexafluoride to chlorine to nitrosyl fluoride is equal to at least 1:1:1.

* * * * *

UNITED STATES PATENT AND TRADEMARK OFFICE
CERTIFICATE OF CORRECTION

PATENT NO. : 4,082,839
DATED : April 4, 1978
INVENTOR(S) : Richard E. Eibeck & Robert E. Booth It is certified that error appears in the above-identified patent and that said Letters Patent are hereby corrected as shown below:

Column 2, line 19, insert -- not -- before "be".

Column 2, line 26, "thionly" should read -- thionyl --.

Column 5, line 52, after "sulfur hexafluoride and" delete second "and".

Column 6, line 11, "25° C" should read -- 25°C --.

Column 6, line 30, "400° C" should read -- 400°C --.

Column 6, line 34, "200° C" should read -- 200°C --.

Column 6, line 62, "64° C" should read -- 64°C --.

Column 10, line 10, "1/8" should read -- 3/8 --.

Column 10, line 11, "NOF: 3HF" should read -- NOF:3HF --.

Column 10, line 53, insert -- was -- after "apparatus".

Signed and Sealed this

Third Day of October 1978

[SEAL]

Attest:

RUTH C. MASON
Attesting Officer

DONALD W. BANNER
Commissioner of Patents and Trademarks